United States Patent [19]
Bruder et al.

[11] Patent Number: 4,941,183
[45] Date of Patent: Jul. 10, 1990

[54] METHOD AND APPARATUS FOR OPTIMIZING THE CUTTING OF MATERIAL

[75] Inventors: Wolfgang Bruder, Bielefeld; Klaus Biervert, Spenge, both of Fed. Rep. of Germany

[73] Assignee: Durkopp System Technik GmbH, Fed. Rep. of Germany

[21] Appl. No.: 70,902

[22] Filed: Jul. 8, 1987

[30] Foreign Application Priority Data

Aug. 6, 1986 [DE] Fed. Rep. of Germany ....... 3627110

[51] Int. Cl.$^5$ .............................................. G06K 9/00
[52] U.S. Cl. .................... 382/8; 83/522.11; 83/936; 364/474.13; 364/474.28
[58] Field of Search .................. 382/8, 58, 30, 65, 48; 358/101, 107; 364/475, 474.03, 474.13, 474.15, 474.28; 83/522, 73, 74, 925 CC; 101/115, 117, 128.21

[56] References Cited

U.S. PATENT DOCUMENTS

| | | | |
|---|---|---|---|
| 2,053,073 | 9/1936 | Gardner | 88/24 |
| 3,431,049 | 3/1969 | Nordgren | 353/11 |
| 3,503,290 | 12/1967 | Valembois et al. | 83/13 |
| 3,596,068 | 7/1971 | Doyle | 364/475 |
| 3,632,197 | 1/1973 | Shelton | 353/44 |
| 3,728,027 | 4/1973 | Watanabe | 356/13 |
| 3,750,507 | 8/1973 | Gerber | 83/169 |
| 3,875,389 | 4/1975 | McFadden et al. | 235/151 |
| 3,887,903 | 6/1975 | Martell | 340/172.5 |
| 4,112,797 | 9/1978 | Pearl | 83/177 |
| 4,133,233 | 1/1979 | Pearl | 83/56 |
| 4,176,566 | 12/1979 | Patterson et al. | 83/29 |
| 4,178,820 | 12/1979 | Gerber | 83/13 |
| 4,314,402 | 2/1982 | Lemmer | 29/721 |
| 4,327,615 | 5/1982 | Gerber et al. | 364/475 |
| 4,621,959 | 11/1986 | Kishi et al. | 364/475 |
| 4,704,694 | 11/1987 | Czerniejewski | 358/101 |
| 4,725,961 | 2/1988 | Pearl | 364/475 |
| 4,739,487 | 4/1988 | Bonnet et al. | 364/475 |

FOREIGN PATENT DOCUMENTS

| | | |
|---|---|---|
| 0165890 | 12/1985 | European Pat. Off. . |
| 1760045 | 4/1972 | Fed. Rep. of Germany . |
| 2570315 | 3/1986 | France . |
| WO82/04266 | 12/1982 | PCT Int'l Appl. . |

Primary Examiner—Leo H. Boudreau
Assistant Examiner—Joseph Mancuso
Attorney, Agent, or Firm—Ostrolenk, Faber, Gerb & Soffen

[57] ABSTRACT

Three embodiments of methods and apparatus according to the invention are each capable of optimizing the cutting of material in accordance with a plurality of templates or predetermined shapes. The method steps required to be carried out manually are greatly simplified. The degree of utilization of the material for a given intended pattern of cutting is determined objectively before cutting to minimize waste, and the degree of utilization is weighed against the subjective feeling of the operator as to the suitability of the specific portions of the workpiece material proposed to be cut. In cutting patterned materials, it is assured that the respective patterning on each piece to be cut out is selected, in a simple manner, to provide for predetermined uniform transitions between the different individual pieces in the finished product, for instance an article of clothing.

19 Claims, 2 Drawing Sheets

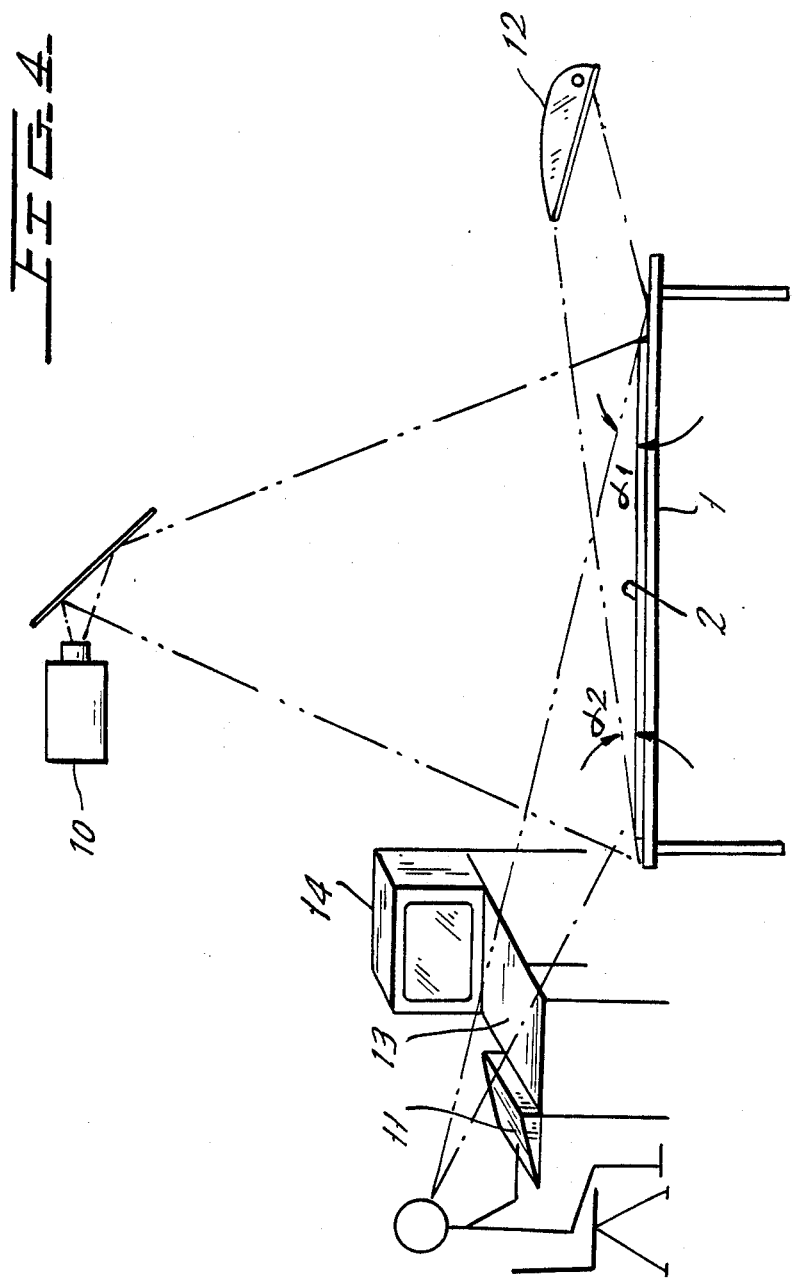

METHOD AND APPARATUS FOR OPTIMIZING THE CUTTING OF MATERIAL

BACKGROUND OF THE INVENTION

1. Field of the Invention

The present invention relates to a method and apparatus for optimizing the cutting of shaped pieces of material from leather, fabric or the like.

2. Description of Related Art

Many different methods are known for cutting out shaped pieces of material. For example, to cut pieces from animal skins, templates may be prepared in accordance with the desired shapes. These templates are placed on the animal skins spread out on the cutting table, and are then manually positioned, taking into consideration all imperfections and other structural features and circumstances pertaining to the leather. The contour or outline of each template is then drawn on the leather and cut out, or the cutting may be effected directly by means of a manual knife which is guided along the template.

Such a method is extremely time-consuming, particularly since smaller templates are very difficult, for ergonomic reasons, to position in the center of an animal skin, which may have dimensions of 3 m×3 m. Furthermore the degree of utilization of the leather, i.e., the ratio of the area of the part cut out to the area of the entire animal skin, can be noted only subjectively and is therefore greatly dependent on the experience of the individual who performs the cutting.

Fabrics or other flexurally limp materials can also be cut out in this same way. If patterned material is involved, the process of locating the templates and performing the cutting is made even more difficult by the fact that the template which is spaced on the material conceals the pattern, and aligning the templates to ensure the desired appearance of the subsequent finished piece is very difficult. In this case the degree of utilization is especially low, since the template cannot be repeatedly aligned and outlined on the workpiece, for reasons of cost.

In the case of cutting out three-dimensional non-planar material, the production of the templates is extremely time-consuming and expensive. If the material to be cut furthermore has an irregular three-dimensional shape, it is practically impossible to adjust the placement of the templates. The only way to improve the degree of utilization is to make new templates or to apply the outlines by free-hand drawing.

It is also known to cut leather by means of stamping dies. In this case the knife-sharp stamping dies have the shapes of the pieces which are to be cut out. The dies are applied and positioned, and then corresponding pieces are punched out of the animal skin by applying force to the stamping dies.

In this case the alignment of the dies is similarly problematic. In addition to the weight of the stamping dies, which makes them difficult to handle, damage to the leather by the sharp cutting edges cannot be prevented. The degree of utilization, too, can only be determined subjectively in this method.

SUMMARY OF THE INVENTION

In view of these disadvantages of prior art methods, the principal object of the invention is to provide a method which simplifies the cutting of material, can be carried out rapidly and with high accuracy, and makes it possible to objectively determine and maximize the degree of utilization of the material.

According to a first aspect of the invention, a method of optimizing the cutting out of pieces of material having predetermined shapes from a workpiece such as leather, patterned fabric or the like, comprises the steps of:

(a) preparing reduced-scale templates corresponding to the shapes of the pieces to be cut out;

(b) placing the templates on a projection device and projecting images of the templates onto the material to be cut, such that images of the templates appear on the workpiece and have the full size of the pieces to be cut out;

(c) then, manually positioning the templates on the projection device while observing their images projected onto the workpiece, to optimize the positioning of the templates, giving due consideration to the imperfections and structural features of the particular workpiece to be cut, and selecting a final position of the templates;

(d) generating digital template data representative of the shape of each individual template and its position on the projection device;

(e) calculating the total area of the cut pieces on the basis of the digital template data;

(f) comparing the total area of the cut pieces with the total area of the workpiece and thereby determining a degree of utilization of the workpiece material;

(g) if said degree of utilization is substantially optimal, generating a start command for causing a cutting device to carry out the cutting according to the template images on the workpiece;

(h) if said degree of utilization is not substantially optimal, repeating steps (b)–(g). According to a second aspect of the invention, a method for optimizing the cutting out of pieces of material having predetermined shapes from a workpiece such as leather, patterned fabric or the like, comprises the steps of:

(a) generating digital shape data representative of the shapes of the pieces to be cut out and the surface area of said shapes and storing said shape data in a computer;

(b) preparing reduced-scale templates corresponding to said shapes of the pieces to be cut out;

(c) placing the templates on a projection device and projecting images of the templates onto the material to be cut, such that images of the templates appear on the workpiece and have the full size of the pieces to be cut out;

(d) manually positioning the templates on the light table while observing their images projected onto the workpiece, to optimize the positioning of the templates, giving due consideration to the imperfections and structural features of the particular workpiece to be cut, and selecting a final position of the templates;

(e) detecting which said templates are present on the projection device and their positions, generating digital template data representative thereof and entering said template data into a computer;

(f) feeding digital workpiece data representative of the total area of the workpiece into the computer;

(g) employing the computer to associate the digital template data with the digital shape data and calculate the ratio of the total area of the cut pieces to the area of the workpiece, thereby determining a degree of utilization of the workpiece material;

(h) if said degree of utilization is substantially optimal, generating a start command for causing a cutting device to carry out the cutting according to the template images on the workpiece;

(i) if said degree of utilization is not substantially optimal, repeating steps (c)–(h).

According to a third aspect of the invention, a method for optimizing the cutting out of pieces of material having predetermined shapes from a workpiece such as leather, patterned fabric or the like, comprises the steps of:

(a) generating digital shape data representative of the shapes of the pieces to be cut out and the surface area of said shapes and storing said shape data in a computer;

(b) calling up selected said shape data from the computer and displaying the corresponding shapes on display means;

(c) projecting the display means image onto the workpiece such that the shapes to be cut appear on the workpiece and have the full size of the pieces to be cut out;

(d) positioning the shapes on the workpiece by means of a computer control device, while considering any imperfections and structural features of the workpiece, thereby optimizing the positions of the shapes on the workpiece, and selecting a final position of the shapes;

(e) employing the computer to calculate the total area of the pieces to be cut out and to compare said area with the area of the workpiece, and thereby determining a degree of utilization of the workpiece material;

(f) if said degree of utilization is substantially optimal, generating a start command for causing a cutting device to carry out the cutting according to the image of the shapes on the workpiece;

(g) if said degree of utilization is not substantially optimal, repeating steps (b)–(f).

According to a further aspect of the invention, a projection device for projecting images of objects and for generating signals representative of the positions of said objects, comprises (a) a light table which includes
  (1) a light source; and
  (2) a resting surface receiving light from said light source and supporting said objects whose images are to be projected, said resting surface including sensing means for sensing the positions of said objects thereon and generating signals representative of said positions; and (b) lens means for projecting said images of said objects supported on said resting surface.

With the method and apparatus of the invention, the operator can position the templates from a location which provides an overall view of the material to be cut, so that imperfections in the material and its structural features can be noted by the operator.

Furthermore, the number and types of templates to be applied (or shapes to be cut out) can be readily varied until the optimal degree of utilization is obtained. The degree of utilization can be weighed against the operator's subjective feeling about the suitable selection of the workpiece material to be cut. That is, the cost of the material and the amount of waste can be objectively balanced against the expected quality of the cutting to be performed.

In addition to this, the method makes it unnecessary to produce individual templates. Furthermore, even patterned materials such as fabric printed with a design can be optimally cut by this method, since the pattern remains recognizable during the placing and positioning of the templates. Thus, the positions of the templates can be selected to assure uniform pattern transitions between the different individual pieces in the finished product, for instance an article of clothing.

Similarly, it is possible to cut out shapes from three-dimensional objects, provided that the templates are produced as a projection of the final cut piece of material.

These advantages are particularly important in automatic cutting units.

BRIEF DESCRIPTION OF THE DRAWINGS

Other objects, features, and advantages of the invention will be seen in the following detailed description of three preferred embodiments thereof, with reference to the drawings, in which:

FIG. 4 is a diagram showing a cutting table and electronic projection and monitoring equipment for carrying out another embodiment of the invention.

DETAILED DESCRIPTION

The following description relates primarily to the cutting out of flat material, particularly animal skins. A similar procedure can be followed for cutting out three-dimensional material, however.

Figure 1:
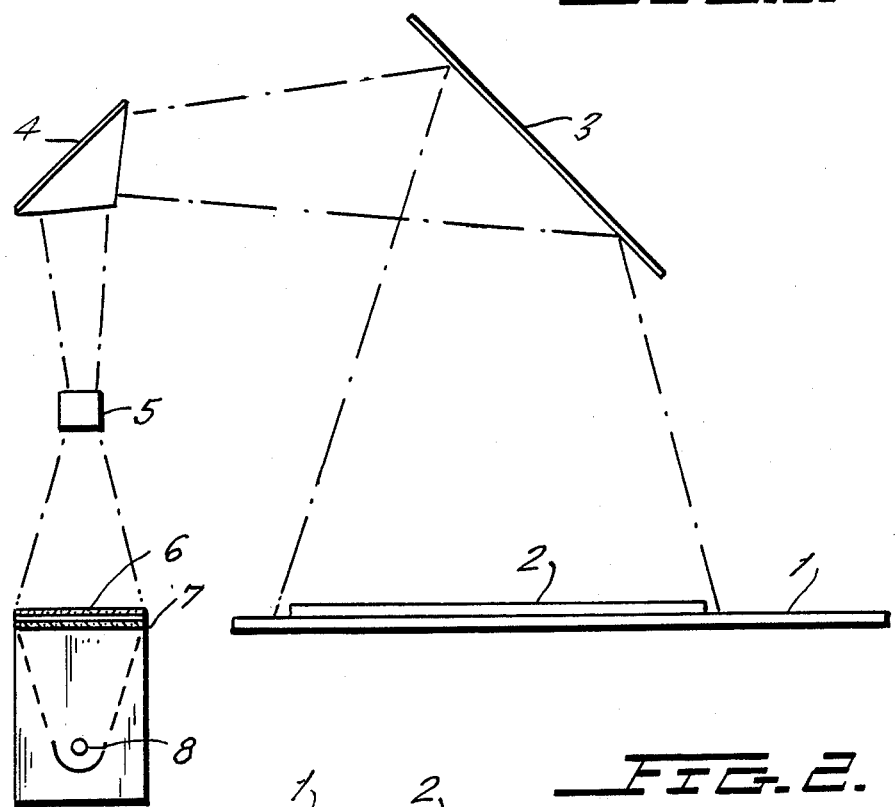
FIG. 1 is a schematic side view showing a cutting table, projection table, and associated optical components for carrying out an embodiment of the invention.

A cutting table (at the right in FIG. 1) comprises a pallet 1 on which the animal skin 2 is spread out flat. It can be brought to the pallet 1 by a transfer system (not shown) and the pallet may be the cutting area of a coordinate cutting machine, for instance a knife, laser or water-jet cutting unit (also not shown). Above the pallet 1 there is a tilted mirror 3. The mirror 3 can be aligned to project an image, onto the pallet 1, from a ridge prism 4 of the projection device (at the left in FIG. 1).

The projection device comprises a light source 8, a Fresnel lens 7 which is arranged above it, a light-transmitting sensing table 6, which serves both as a light table and as a resting surface, for purposes to be described, and an objective lens 5. The sensing table 6 is smaller than the pallet 1 by a ratio of 1:5, for example.

Figure 3:
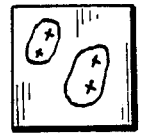
FIG. 3 is a schematic top view of the projection table showing templates thereon.
Figure 2:
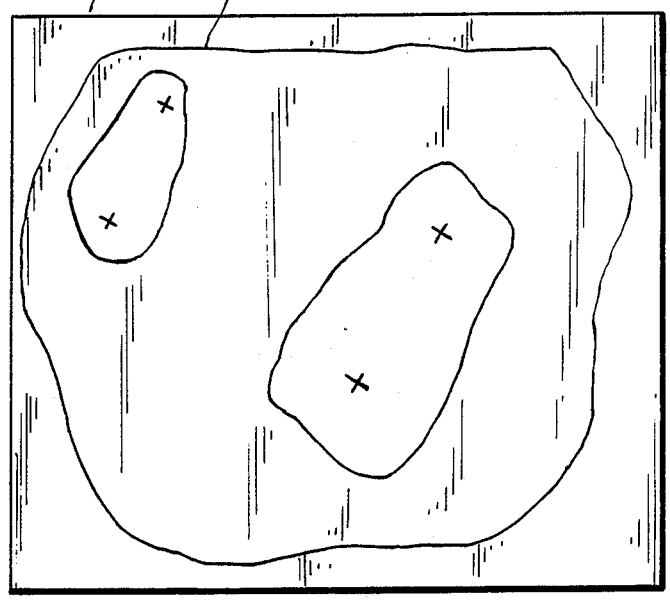
FIG. 2 is a schematic top view of the cutting table showing template images thereon.

For cutting out predetermined shapes from the workpiece, templates are produced also on a scale of 1:5 and laid on the light-transmitting sensing table 6 of the projection device. The images of the templates are projected by the lens 5 and the light-deflecting devices 4, 3 onto the animal skin 2, so that the images of the templates appear on the animal skin 2 in the full size of the pattern to be cut out (see FIGS. 2 and 3). This is made possible by a suitable arrangement of the lens 5 and the other components of the projection device. It is advantageous for the templates to comprise translucent material, since then only their outlines are imaged on the animal skin 2. By the use of the ridge prism 4, it is assured that a laterally correct projection of the templates takes place, such that shifting a template on the sensing table 6 causes a change in position of the projected template contour in the same direction.

The templates are now selected and positioned manually by an operator, taking into consideration any imperfections in the leather 2 and its structural condition and features.

After the templates are laid out, the position and the outline of each individual template is detected by means of sensing table 6, digitized, and stored in a computer (not shown in FIGS. 1–3), which is connected to the sensing table 6. The sensing table 6 preferably is of the type which comprises a glass plate having a network of conductors arranged therein, but other devices also could be employed.

The sensing table preferably cooperates with a scanning device (not shown), for example a pencil which induces a magnetic field in the conductors in the glass plate, and can be guided over the glass plate along the outlines of the templates which are laid out there. As the scanning device moves along the outline of each template, changes in the magnetic field adjacent each of the conductive paths in the sensing table can be detected. These changes in field are sensed and in each case associated with a nodal point on a coordinate system defined in the sensing table so that the template contour is stored in the computer as a family of digitized x/y coordinates. The required raster spacing of the network of conductive paths in the sensing table is determined by the required precision of the contour as represented by the stored data.

The basic development of such a digitizing sensing table is part of the prior art and therefore will not be described in greater detail. It is important, however, that the light-permeability of the glass plate be selected very high in order to obtain a high contrast of the projected contours.

From the contours detected, the total area of the templates which have been laid out is calculated in the computer and the ratio thereof to the total area of the animal skin (the degree of utilization) is established. The degree of utilization determined in this manner is then made known in a suitable form to the operator.

To find the total surface area of the animal skin, as well as the area of the templates, a similar light-transmitting sensing table arranged on the cutting table could be employed. This, however, is not necessary in most cases, since for the most part the total area of a skin is determined by the tannery and written thereon. Similarly, the area of each template is contemplated to be engraved or otherwise marked on the template itself. In either case, the corresponding numerical value can be entered directly into the computer by a keyboard, for example.

In the event that the resultant degree of utilization is calculated to be too low, i.e. the waste is too great, the selection and laying out of the templates is started over again. An acceptable value cannot be defined in general, but rather is dependent on the quality of the animal skin and the requirements for the subsequent finished piece. However, if desired, a predetermined minimum degree of utilization may be defined. When an acceptable degree of utilization is calculated, the automatic cutting device, which is also connected to the computer, receives a manual or automatic start command and the cutting takes place automatically along the cutting lines predetermined by the templates, by means of the digitized data representative of the contours, which have been stored in the computer.

The control of the automatic cutting system can be effected by hardwiring in the computer or by a suitable computer program.

According to a second embodiment of the invention, a method by which cutting can be optimized includes first introducing the contours of the patterns to be cut directly into the computer and storing them there, which also can take place via hardwiring or a suitable computer program.

In this case, the templates, which are again reduced on a suitable scale, must be identifiable by the computer as they rest on the projection device, for example by a coding system, and their position must also be determinable. For the determination of the lateral and angular position, two markings arranged at specific places on each template are sufficient, they being detected, for instance, by the light-transmitting sensing table 6. The identification can be effected, for instance, by a bar code which is read by a light pencil. The prior art knows many different machine-readable coding systems, and systems for their subsequent decoding, which could be used here.

It would also be conceivable to arrange an electronic camera over the resting surface of the projection device, the camera being connected to the computer and carrying out the identification and recognition of the position of the templates. See, e.g., the commonly assigned and copending U.S. Pat. application of Wolfgang Bruder, Ser. No. 937,880, filed Dec. 4, 1986, titled "Method and Apparatus for Automatically Cutting Material in Standard Patterns," the disclosures of which are incorporated by reference herein. The further course of the process, from the positioning to the cutting, corresponds to that already described.

Referring now to FIG. 4, a third embodiment of the invention will be explained. In this embodiment, the computer system includes a graphics monitor 14 and an electronic projector 10 of high light-transmitting capacity, such as that sold by Hughes Aircraft under the tradename "Graphics Projector 700," and is connected by means of a CNC control arrangement to the cutting system.

The individual contours of the pieces to be cut out are entered and stored in the computer. A given code is associated with each contour so that they can be called up individually and displayed in any combination or arrangement with each other on the monitor 14. The electronic projector 10 projects an image identical to the monitor image. The projector is arranged so that this projection strikes, by means of suitable optical components, vertically onto the pallet 1 on which the material 2 to be cut is located, the projected image being the full size of the pieces to be cut out.

The operator now selects different contours, which appear on the monitor 14, and also appear as a light image on the material 2 to be cut. In accordance with the imperfections and structural condition and features of the material 2 to be cut, the individual contours are selectively shifted by means of a scanning device 11, for instance a joy stick or a mouse. It is important for each contour to be controllable individually and for movement of one contour not to affect the position of the other contours. Furthermore, it must be assured that each contour shown can be erased individually and replaced by a new one without the other contours shown being affected. Suitable hardwired computer components and suitable computer programs for carrying out these functions are known and have been used, inter alia, in so-called video games and other graphics applications.

When the optimum number and arrangement of contours is determined and shown positioned on the monitor 14 and on the material 2 to be cut, the codes and positions of the contours are communicated to the computer. It is also possible by suitable wiring or by a suitable computer program to have the computer automatically effect the identification and the recognition of the position of the contours. From all of the contours, the total area of the pieces cut out is calculated and the ratio thereof to the area of the material 2 to be cut is established. The degree of utilization thus calculated is made known to the operator in suitable manner and if the value is acceptable, the automatic cutting system (not shown) which is also connected to the computer, receives a start command and the cutting is effected automatically along the cutting lines which have been previously established by the projector 10. In the event that the computer automatically identifies and determines the position of the individual contours, the degree of utilization can advantageously be determined immediately and thus optimized even faster.

It is also possible to use a laser scanner system instead of the bright-light electronic projector 10. In this case it may be necessary, due to the low speed of deflection of mechanical scanner systems, not to image the entire monitor picture, but only partial regions which can be selected by the operator.

For carrying out all the method embodiments of the invention described above, it is advantageous for a reflector 12 with a source of light, the intensity of which may be about 600 lumens, to be arranged beside the cutting table and opposite the operator's table 13, so that the light emitted by it strikes the material 2 to be cut at an angle $alpha_1$, less than 30°; and for the operator's table 13 to be set up so that the operator's angle of view $alpha_2$ onto the material 2 to be cut is of approximately the same order of magnitude. By such lateral illumination, imperfections, for instance, in the surface of an animal skin, throw a shadow in the direction toward the operator. Since the area of the shadow is greater than the actual visible image of the imperfection, the identification thereof is substantially facilitated.

Furthermore, the operator has a good overall view of the material 2 to be cut and, with the third method embodiment of the invention, can position the templates if desired without looking at a monitor image.

Although three illustrative embodiments of the invention have been described herein, it is to be understood that the invention is not limited to such embodiments. Rather, modifications and variations thereof may occur to one of ordinary skill in the art within the scope of the invention, as defined by the claims.

What is claimed is:

1. A method of optimizing the cutting out of pieces of material having predetermined shapes from a workpiece such as leather, patterned fabric or the like, comprising the steps of:
   (a) preparing reduced-scale templates corresponding to the shapes of the pieces to be cut out;
   (b) placing the templates on a projection device and projecting images of the templates onto the material to be cut, such that images of the templates appear on the workpiece and have the full size of the pieces to be cut out;
   (c) then, manually positioning the templates on the projection device while observing their images projected onto the workpiece, to optimize the positioning of the templates, giving due consideration to the imperfections and structural features of the particular workpiece to be cut, and selecting a final position of the templates;
   (d) generating digital template data representative of the shape of each individual template and its position on the projection device;
   (e) calculating the total area of the cut pieces on the basis of the digital template data;
   (f) comparing the total area of the cut pieces with the total area of the workpiece and thereby determining a degree of utilization of the workpiece material;
   (g) if said degree of utilization is substantially optimal, generating a start command for causing a cutting device to carry out the cutting according to the template images on the workpiece;
   (h) if said degree of utilization is not substantially optimal, repeating steps (b)–(g).

2. A method as in claim 1, further comprising defining an acceptable minimum degree of utilization which will be considered to be substantially optimal.

3. A method as in claim 1, wherein said digital template data are generated by providing a resting surface for said projection device on which said templates are placed, said resting surface having sensing means associated therewith for sensing the dimensions and locations of the template.

4. A method as in claim 3, wherein said resting surface is the surface of a light table and said template images are projected by passing light from said light table past said templates.

5. A method as in claim 1, wherein the template images projected on the workpiece are substantially outline images.

6. A method as in claim 1, wherein said templates comprise substantially translucent material.

7. A method as in claim 1, further comprising feeding said digital template data into a computer and employing the computer to calculate the degree of utilization and to control the cutting device.

8. A method for optimizing the cutting out of pieces of material having predetermined shapes from a workpiece such as leather, patterned fabric or the like, comprising the steps of:
   (a) generating digital shape data representative of the shapes of the pieces to be cut out and the surface area of said shapes and storing said shape data in a computer;
   (b) preparing reduced-scale templates corresponding to said shapes of the pieces to be cut out;
   (c) placing the templates on a projection device and projecting images of the templates onto the material to be cut, such that images of the templates appear on the workpiece and have the full size of the pieces to be cut out;
   (d) manually positioning the templates on the light table while observing their images projected onto the workpiece, to optimize the positioning of the templates, giving due consideration to the imperfections and structural features of the particular workpiece to be cut, and selecting a final position of the templates;
   (e) detecting which said templates are present on the projection device and their positions, generating digital template data representative thereof and entering said template data into a computer;

(f) feeding digital workpiece data representative of the total area of the workpiece into the computer;

(g) employing the computer to associate the digital template data with the digital shape data and calculate the ratio of the total area of the cut pieces to the area of the workpiece, thereby determining a degree of utilization of the workpiece material;

(h) if said degree of utilization is substantially optimal, generating a start command for causing a cutting device to carry out the cutting according to the template images on the workpiece;

(i) if said degree of utilization is not substantially optimal, repeating steps (c)–(h).

9. A method as in claim 8, further comprising defining an acceptable minimum degree of utilization which will be considered to be substantially optimal.

10. A method as in claim 8, wherein said digital template data are generated by providing a resting surface for said projection device on which said templates are placed, said resting surface having sensing means associated therewith for sensing the dimensions and locations of the template.

11. A method as in claim 10, wherein said resting surface is the surface of a light table and said template images are projected by passing light from said light table past said templates.

12. A method as in claim 8, wherein said digital template data are generated by reading respective identifying codes placed on said templates.

13. A method as in claim 8, wherein said digital template data are generated by detecting respective identifying markings placed on said templates.

14. A method as in claim 8, wherein the template images projected on the workpiece are substantially outline images.

15. A method as in claim 8, wherein said templates comprise substantially translucent material.

16. A method for optimizing the cutting out of pieces of material having predetermined shapes from a workpiece such as leather, patterned fabric or the like, comprising the steps of:

(a) generating digital shape data representative of the shapes of the pieces to be cut out and the surface area of said shapes and storing said shape data in a computer;

(b) calling up selected said shape data from the computer and displaying the corresponding shapes on display means;

(c) projecting the display means image onto the workpiece such that the shapes to be cut appear on the workpiece and have the full size of the pieces to be cut out;

(d) positioning the shapes on the workpiece by means of a computer control device, while considering any imperfections and structural features of the workpiece, thereby optimizing the positions of the shapes on the workpiece, and selecting a final position of the shapes;

(e) employing the computer to calculate the total area of the pieces to be cut out and to compare said area with the area of the workpiece, and thereby determining a degree of utilization of the workpiece material;

(f) if said degree of utilization is substantially optimal, generating a start command for causing a cutting device to carry out the cutting according to the image of the shapes on the workpiece;

(g) if said degree of utilization is not substantially optimal, repeating steps (b)–(f).

17. A method as in claim 16, further comprising defining an acceptable minimum degree of utilization which will be considered to be substantially optimal.

18. A method as in claim 16, wherein the template images projected on the workpiece are substantially outline images.

19. A method as in claim 16, including employing the computer to control the cutting device.

* * * * *